United States Patent Office 3,629,305
Patented Dec. 21, 1971

3,629,305
STABILIZED COMPOSITIONS OF ALKALINE METAL SALTS OF ESTROGEN SULPHATES
Luigi Bernardi and Ugo Pallini, Milan, Italy, assignors to Società Farmaceutici Italia, Milan, Italy
No Drawing. Filed July 23, 1969, Ser. No. 844,155
Claims priority, application Italy, July 24, 1968, 19,351/68
Int. Cl. C07c *169/08*
U.S. Cl. 260—397.4          13 Claims

ABSTRACT OF THE DISCLOSURE

A process for the preparation of a stable composition of alkaline salt of synthetic estrogen sulphate. An alkaline salt of a synthetic estrogen sulphate selected from the group consisting of estrone sulphate and equiline sulphate, is mixed with an aminoacid selected from the group consisting of glycine, L-lysine, L-arginine, L-ornithine and their salts.

---

The present invention relates to stabilized compositions of alkaline metal salts of estrogen sulphates. The biological and commercial importance of the estrogen sulphates is well known. The sodium salt of the estrone and equiline sulphate are components of the estrogen fraction, soluble in water, extracted from the urine of pregnant mare. Both the sodium and the potassium salt of the synthetic estrone sulphate and of the synthetic equiline sulphate can be easily decomposed. When stored at room temperature in the crystalline state, they become insoluble in water after a short time owing to the formation of estrone and equiline and of sodium or potassium hydrogen sulphate respectively.

Various methods have been attempted to stabilize the sodium or potassium salt of the estrone sulphate. N-methylglucamine is the only compound which has given positive results for its stabilizing action. Its use is described in U.S. Pat. No. 3,024,257. A stabilizing action on the sodium salt of the estrone sulphate is also given by mixing the sulphate with an extract of urine of pregnant mare, which contains, among others, mixtures of sulphates of conjugated estrogens. This method is described in Canadian Pat. No. 691,988. We have found, and this is the object of our invention, that the addition of some aminoacids to the sodium or potassium salt of the synthetic estrone sulphate and of the synthetic equiline sulphate surprisingly prevents their spontaneous decomposition.

According to our invention, an aminoacid selected from the group consisting of glycine, L-lysine, L-arginine and L-ornithine, either free or salified, is mixed with the sodium or potassium salt of the sulphate of an estrogen selected from the group consisting of estrone and equiline. The resulting mixture is soluble in water even after a long storage in the dry state.

The deep or intimate mixing of the sulphates and the aminoacids may be effected either directly with the crystalline products in blenders or mills, or with a solvent which is later removed under reduced pressure or with water which is later eliminated by evaporation lyophilization. The solvents used can be low molecular weight aliphatic alcohols containing from 1 to 4 carbon atoms. The molar ratio between aminoacid and sulphate may vary from 0.5 to 6 times. The weight ratio may vary from 0.2 to 2.5 according to the aminoacids used.

Furthermore, we have found that the aminoacids of the invention can give salts with the estrogen sulphates and particularly with the estrone sulphate. These salts show the characteristic of being soluble in water at a neutral pH and of being stable when stored in the solid state.

The following examples are to illustrate the invention, without limiting it.

EXAMPLE 1

41.3 milligrams of the sodium salt of estrone sulphate were dissolved in 3 cc. of water together with 19.8 mg. of L-lysine base. The solution was evaporated under reduced pressure. The residue obtained, consisting of the mixture of the two compounds, was stable.

EXAMPLE 2

Operating as in Example 1, starting from 22 mg. of sodium salt of estrone sulphate and 16.2 mg. of L-lysine base, a stable mixture was obtained.

EXAMPLE 3

Operating as in Example 1, starting from 36.2 mg. of sodium salt of estrone sulphate and 35.4 mg. of L-lysine monohydrochloride, a stable mixture was obtained.

EXAMPLE 4

Operating as in Example 1, starting from 36.1 mg. of sodium salt of estrone sulphate and 35.2 mg. of L-ornithine base, a stable mixture was obtained.

EXAMPLE 5

37.3 milligrams of sodium salt of estrone sulphate and 5 cc. of a 0.04 N aqueous solution of L-lysine base, obtained from the corresponding monohydrochloride with sodium hydroxide, were dried by evaporation under vacuum to yield a stable mixture.

EXAMPLE 6

Operating as in Example 1, starting from 25.2 mg. of sodium salt of estrone sulphate and 28 mg. of L-lysine carbonate, a stable mixture was obtained.

EXAMPLE 7

24.5 milligrams of sodium salt of estrone sulphate were deeply mixed in a mortar with 19.3 mg. of L-lysine base. The mixture obtained contains the sodium salt of the sulphate in a stable form.

EXAMPLE 8

28 milligrams of sodium salt of estrone sulphate were dissolved in 2 cc. of water together with 20 mg. of glycine. The solution was lyophilized and a powder was obtained containing the sodium salt of the estrone sulphate in stable form.

EXAMPLE 9

Operating as in Example 1, starting from 35.2 mg. of sodium salt of estrone sulphate and 14.2 mg. of glycine, a stable mixture was obtained.

EXAMPLE 10

Operating as in Example 1, starting from 39.3 mg. of sodium salt of estrone sulphate and 44.4 mg. of L-arginine monohydrochloride, a stable mixture was obtained.

EXAMPLE 11

Operating as in Example 1, starting from 39.8 mg. of sodium salt of estrone sulphate and 37.2 mg. of L-arginine, a stable mixture was obtained.

EXAMPLE 12

20 miligrams of sodium salt of equiline sulphate were dissolved in 3.3 cc. of 0.04 N aqueous solution of L-lysine base, obtained from the corresponding monohydrochloride with sodium hydroxide. The solution obtained was evaporated to dryness under reduced pressure to yield a stable mixture.

EXAMPLE 13

42.4 milligrams of sodium salt of equiline sulphate and 47.4 mg. of L-lysine carbonate were dissolved in 3 cc. of water. The solution was evaporated to dryness under reduced pressure. The residue obtained was stable.

EXAMPLE 14

A solution containing 30.4 mg. of sodium salt of equiline sulphate and 30 mg. of L-lysine monohydrochloride in 2 cc. of water was lyophilized. The residue obtained was stable.

EXAMPLE 15

Operating as in Example 14, starting from 30.8 mg. of sodium salt of equiline sulphate and 34.4 mg. of L-lysine carbonate, a stable residue was obtained.

EXAMPLE 16

Operating as in Example 13, starting from 30.1 mg. of sodium salt of equiline sulphate and 12.2 mg. of glycine, a stable residue was obtained.

EXAMPLE 17

Estrone and lysine double sulphate 200 mg. of estrone dissolved in pyridine were added to a solution prepared from 415 mg. of pyridine sulphate, 5.2 cc. of pyridine and 0.166 cc. of acetic anhydride shaken at room temperature for one hour and a half. The mixture was shaken at room temperature for 20 hours. It was dried under vacuum, taken up with water and treated with 5 cc. of an L-lysine aqueous solution (1.3 g. in 5 cc. of water) up to pH 9. After extraction with ether, the extract was dried and about 60 mg. of unaltered estrone were obtained. The aqueous layer was extracted with n-butanol. The butanolic extract was washed twice with water and dried. The residue was dissolved in a little methanol, filtered, dried and triturated with ether. 150 mg. of double estrone and lysine sulphate melting at 240–250° C., were filtered off. The compound was stable at 65° C. for a period of at least three weeks (100% of unaltered sulphate).

The stability of the mixtures obtained, as described in the examples, has been determined during periods from 1 week to 12 weeks at temperatures of from 42 to 65° C. The percentage contents of unaltered sodium salt of estrone sulphate and of unaltered sodium salt of equiline sulphate has been determined and listed in Tables 1 and 2. Observation of the data obtained in comparison with those from the controls, these data consisting of the sole sodium salt of crystalline estrone sulphate or of the sole sodium salt of crystalline equiline sulphate respectively, makes evident the surprising stability that the mixture with the aminoacids of the invention gives to the sodium salts of the estrone and equiline sulphates.

TABLE 1.—PERCENTAGE OF SODIUM SALT OF UNALTERED ESTRONE SULPHATE

| | 42° C. | | 65° C. | | | | | | |
|---|---|---|---|---|---|---|---|---|---|
| | 1 week | 2 weeks | 1 day | 1 week | 2 weeks | 3 weeks | 5 weeks | 8 weeks | 12 weeks |
| Controls | 30 | 15 | 45 | | | | | | |
| Example: | | | | | | | | | |
| 4 | | | | | 100 | | 98 | | |
| 5 | 100 | 100 | | 100 | 100 | | 100 | | 99 |
| 2, 3, 6 | | | | | 100 | | 100 | 100 | |
| 1, 7 | | | | | 100 | | 99 | | |
| 8, 9 | | | | 100 | 100 | | 97 | | |
| 10, 11 | | | | 100 | 98 | 98 | | | |

TABLE 2.—PERCENTAGE OF SODIUM SALT OF UNALTERED EQUILINE SULPHATE

| | 42° C. | | 65° C. | | | | |
|---|---|---|---|---|---|---|---|
| | 1 week | 2 weeks | 1 week | 4 weeks | 5 weeks | 8 weeks | 12 weeks |
| Controls | 10 | | 0 | | | | |
| Example: | | | | | | | |
| 12 | 100 | 100 | 100 | 100 | 100 | | 99 |
| 13 | | | 100 | 100 | 100 | 100 | |
| 14, 16 | | | 100 | 99 | | | |
| 15 | | | 100 | 100 | 100 | | |

We claim:
1. The process for the preparation of a stable composition of sodium salt of synthetic estrogen sulphate which comprises mixing the sodium salt of a synthetic estrogen sulphate selected from the group consisting of estrone sulphate and equiline sulphate, with an aminoacid selected from the group consisting of glycine, L-lysine, L-arginine, L-ornithine, L-lysine monohydrochloride, L-lysine carbonate, and L-arginine monohydrochloride.

2. A stable composition of sodium salt of a synthetic estrogen sulphate consisting of a mixture of the sodium salt of a synthetic estrogen sulphate selected from the group consisting of estrone sulphate and equiline sulphate and of an aminoacid selected from the group consisting of glycine, L-lysine, L-arginine, L-ornithine, L-lysine monohydrochloride, L-lysine carbonate, and L-arginine monohydrochloride.

3. The stable composition of claim 2 consisting of a mixture of sodium salt of estrone sulphate and glycine.

4. The stable composition of claim 2 consisting of a mixture of sodium salt of estrone sulphate and L-lysine monohydrochloride or carbonate.

5. The stable composition of claim 2 consisting of a mixture of sodium salt of estrone sulphate and L-lysine.

6. The stable composition of claim 2 consisting of a mixture of sodium salt of estrone sulphate and L-arginine monohydrochloride.

7. The stable composition of claim 2 consisting of a mixture of sodium salt of estrone sulphate and L-arginine.

8. The stable composition of claim 2 consisting of a mixture of sodium salt of estrone sulphate and L-ornithine.

9. The stable composition of claim 2 consisting of a mixture of sodium salt of equiline sulphate and glycine.

10. The stable composition of claim 2 consisting of a mixture of sodium salt of equiline sulphate and L-lysine monohydrochloride or carbonate.

11. The stable composition of claim 2 consisting of a mixture of sodium salt of equiline sulphate and L-lysine.

12. The stable composition of claim 2 consisting of a mixture of sodium salt of equiline sulphate and L-arginine.

13. The stable composition of claim 2 consisting of a mixture of sodium salt of equiline sulphate and L-ornithine.

No references cited.

HENRY A. FRENCH, Primary Examiner